Nov. 6, 1951          A. C. SEYMOUR          2,573,934
TOTALIZER SELECTOR MEANS FOR COMPUTING AND RECORDING MACHINES
Filed Feb. 22, 1945          7 Sheets-Sheet 2

INVENTOR
ARTHUR C. SEYMOUR
BY *Robert J. Hulsizer*
ATTORNEY

Nov. 6, 1951 A. C. SEYMOUR 2,573,934
TOTALIZER SELECTOR MEANS FOR COMPUTING AND RECORDING MACHINES
Filed Feb. 22, 1945 7 Sheets-Sheet 3

INVENTOR
ARTHUR C. SEYMOUR
BY
Robert I. Hulsizer
ATTORNEY

Nov. 6, 1951  A. C. SEYMOUR  2,573,934
TOTALIZER SELECTOR MEANS FOR COMPUTING AND RECORDING MACHINES
Filed Feb. 22, 1945  7 Sheets—Sheet 4

INVENTOR
ARTHUR C. SEYMOUR
BY
Robert I. Hulsizer
ATTORNEY

Nov. 6, 1951  A. C. SEYMOUR  2,573,934
TOTALIZER SELECTOR MEANS FOR COMPUTING AND RECORDING MACHINES
Filed Feb. 22, 1945  7 Sheets-Sheet 5

INVENTOR
ARTHUR C. SEYMOUR
BY
Robert I. Hulsizer
ATTORNEY

Nov. 6, 1951
A. C. SEYMOUR
2,573,934
TOTALIZER SELECTOR MEANS FOR COMPUTING AND RECORDING MACHINES
Filed Feb. 22, 1945
7 Sheets-Sheet 6
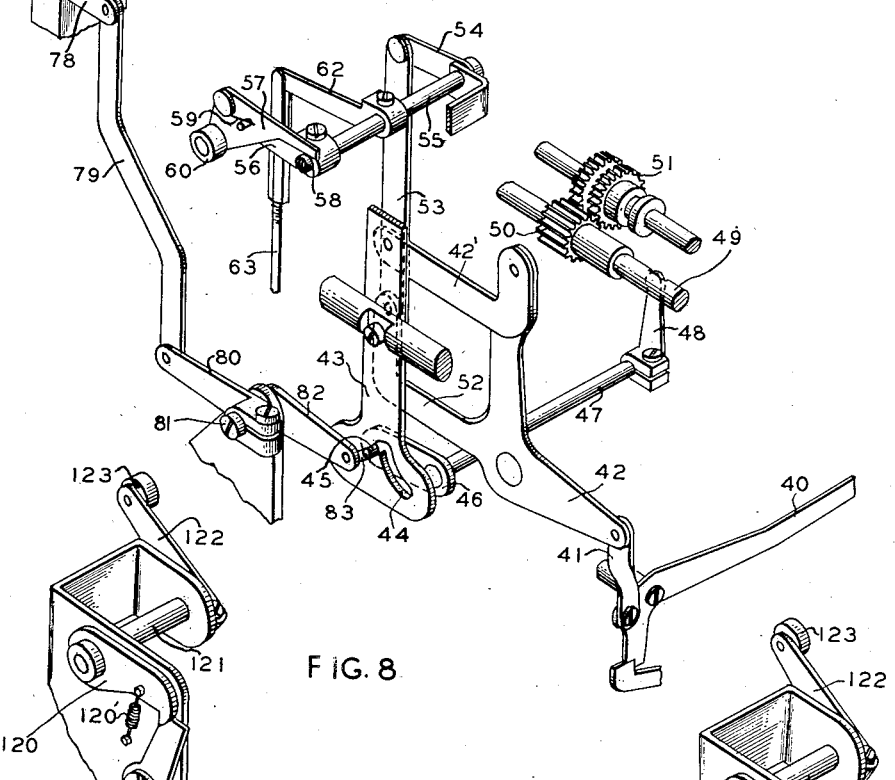
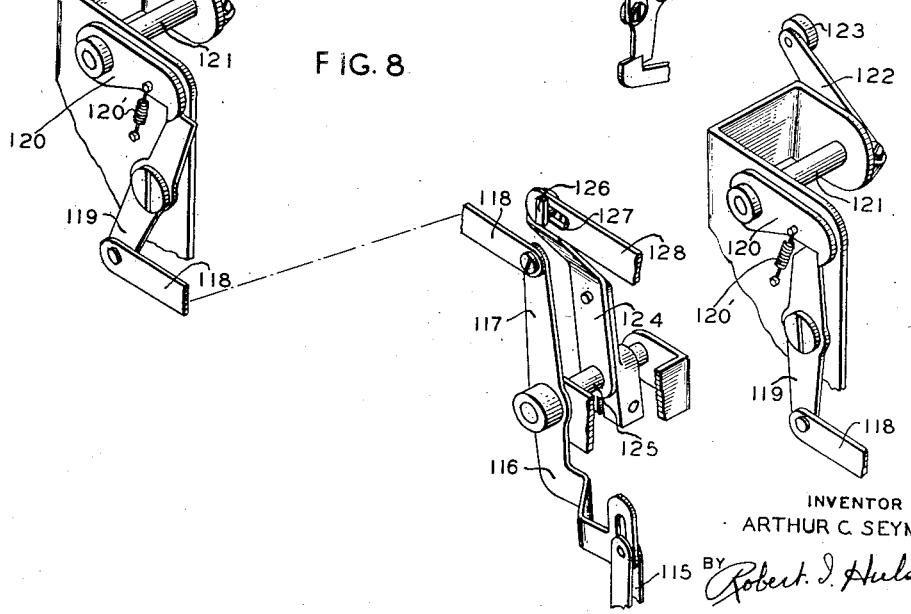
INVENTOR
ARTHUR C. SEYMOUR
BY Robert I. Hulsizer
ATTORNEY Nov. 6, 1951   A. C. SEYMOUR   2,573,934
TOTALIZER SELECTOR MEANS FOR COMPUTING AND RECORDING MACHINES
Filed Feb. 22, 1945   7 Sheets-Sheet 7

INVENTOR
ARTHUR C. SEYMOUR
BY
Robert I. Hulsizer
ATTORNEY

Patented Nov. 6, 1951

2,573,934

UNITED STATES PATENT OFFICE 2,573,934

TOTALIZER SELECTOR MEANS FOR COMPUTING AND RECORDING MACHINES

Arthur C. Seymour, Frankfort, N. Y., assignor to Remington Rand Inc., Buffalo, N. Y., a corporation of Delaware Application February 22, 1945, Serial No. 579,227

25 Claims. (Cl. 235—59)

This invention relates to a new and useful improvement in computing and recording machines and has particular reference to one in which composite bills may be prepared, such, for example, as those in which items relating to gas and electric consumption may be separately entered on the bill in different horizontal lines thereof.

An object of the invention is to permit an operator to make entries in a vertical column on a bill sheet and enter some of these items in one vertical totalizer and others into another totalizer at will.

A further object is to permit the operator readily to select into which totalizer the entries are to be made.

A still further object is to cause the entering mechanism to be automatically associated with a particular totalizer when the carriage is returned to its normal starting position at the beginning of a new line.

Yet another object is to permit a cross totalizer to be readily disconnected at will from all the vertical totalizers and then automatically associated therewith by the return of the carriage to normal starting position.

Another object is to lock a certain type of key when particular entries are being made and to lock another type of key when other types of entries are being made.

Further and more specific objects, features, and advantages will more clearly appear from a consideration of the detailed description hereinafter especially when taken in connection with the accompanying drawings which illustrate a present preferred application of the invention and which form part of the annexed specification.

Briefly and in general terms the invention concerns the writing of a composite bill, for instance a bill in which charges for gas and electricity are combined in the one bill. In such a bill, it is desired to print in one vertical column items which relate to both the gas bill and the electric bill and at the same time to enter these respective items in different totalizers.

For example, with respect to the electric feature of the bill, the various factors of this portion of the bill are printed as "kilowatt-hours," "gross cost," "net cost." These values are not only printed on the bill in their respective vertical columns of the sheet but they are, in the usual manner, entered respectively into vertical totalizers which are mounted on the vertical truck in positions corresponding to these columns.

On the next line of the bill, it is desired to print, in the same series of columns, factors relating to the "gas" portion of the bill, such as "consumption," "gross cost," "net cost" and "arrears." However, these items are to be entered into a separate set of totalizers which are mounted on the same vertical truck as the others but are respectively disposed above or below the previously mentioned ones. In order to achieve this result each set of vertical totalizers is connected or associated with its own separate master wheel, and means is provided so that the operator, when printing electric items may connect the totalizers receiving such items with their master wheel and at the same operation disconnect from their master wheel the totalizers, which receive the "gas" items. In essence therefore when one set of totalizers is set to receive items the other set is disconnected and vice versa.

The invention further concerns an automatic device operated by the carriage as it is returned to normal position at the beginning of a new line to shift the connections from one set of vertical totalizers to the other so that when a new line is to be printed the operator will know that a particular set of totalizers is connected for entry of items. In the machine shown herein the parts are so related that when the carriage is returned to starting position and spaced to the next line the set of totalizers adapted to receive "electric" entries is in operative condition while the set of totalizers adapted to receive "gas" entries is disconnected. Therefore, if in that line it is desired to print "gas" items, the operator must manually shift the connections from one set of totalizers to the other.

The invention further concerns means whereby the operator, when writing a horizontal line of entries relating to one set of items, will print a symbol such as "EL" for electric and "GS" for gas items and it is so arranged mechanically that if the totalizers are connected for electric entries the operator cannot operate the "Gas" symbol key and vice versa, thus enabling the operator to know whether the connections are set in accordance with the kind of entries it is desired to make.

A further feature of the invention concerns the usual cross totalizer which is mounted on its own cross truck and which receives desired items for the purpose of accumulating certain totals which may or may not later be automatically printed in selected columns of the sheet. A device is provided whereby the operator can, at will, disconnect this cross totalizer but, when the carriage is returned to its normal position at the beginning of a new line, automatic means restores the cross totalizer to its operative condition.

In summation therefore the main feature of the invention comprises a vertical truck with a plurality of superposed totalizers thereon with means whereby they can be selectively connected and disconnected to receive items of differing nature although these items are printed in the same vertical column on the sheet.

A preferred form of the invention is shown in the drawings, in which

Fig. 7 is an isometric view of the connections between the shift lever and the two master wheel mechanisms controlled thereby;

Fig. 8 is an isometric view of the mechanism for disconnecting the cross master wheel, showing it in unlatched position;

Fig. 9 is a similar view showing the same parts in latched position;

Figure 1:
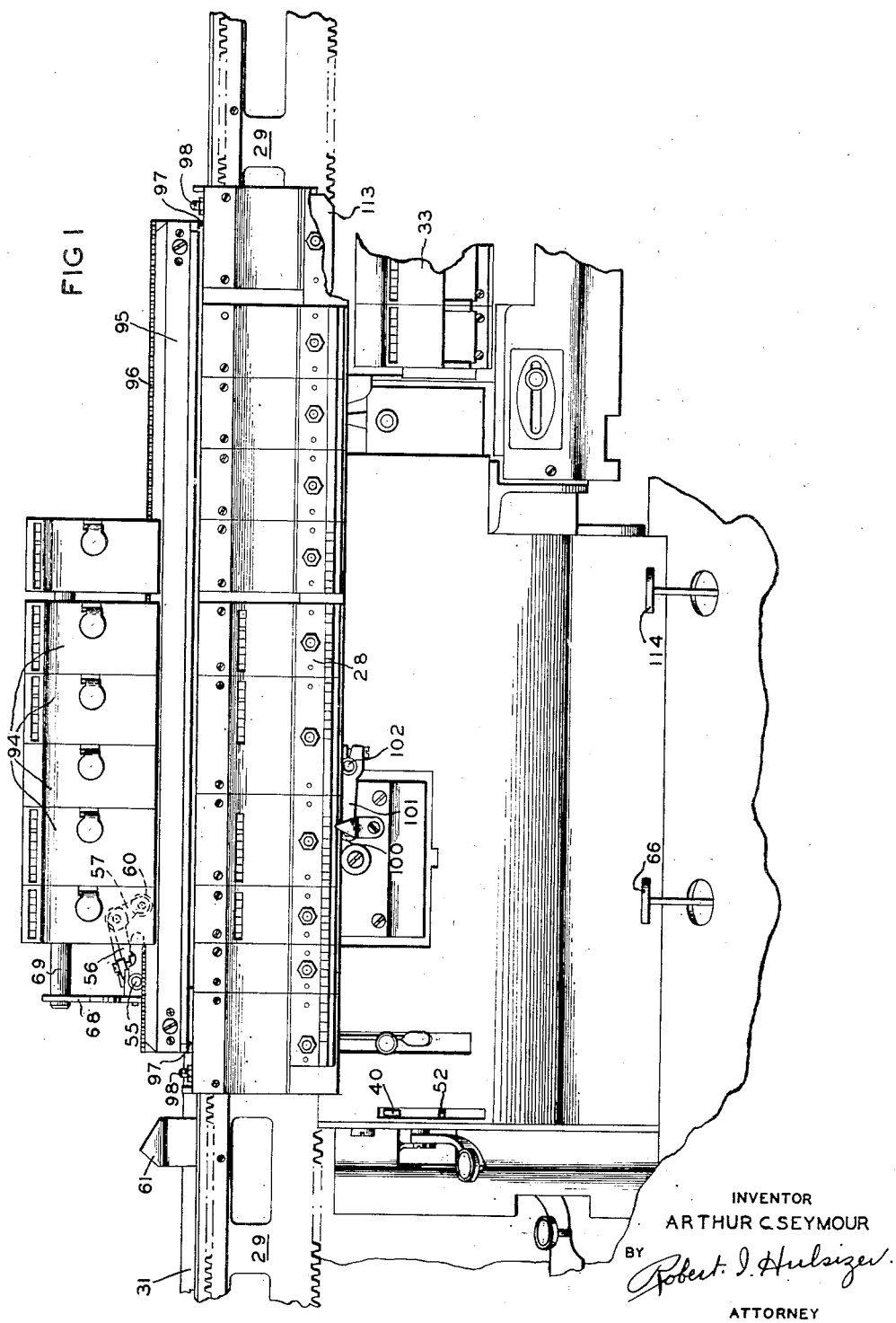
Fig. 1 is a fragmentary front elevation of the machine, showing the vertical truck with the vertically superposed totalizers thereon.

In the following detailed specification, it is to be understood that a considerable portion of the mechanism shown is and has been used in the regular Remington bookkeeping typewriter and for that reason these parts will be described only sufficiently to co-relate them with the parts of the machine which are novel and which constitute the invention. Reference to certain U. S. patents will enable a person skilled in the art more completely to comprehend the operation of the entire machine. Such patents for example are U. S. patent to John C. Wahl, No. 1,270,471 issued June 25, 1918 and entitled "Calculating Machine" in which is clearly and in detail shown the relation between the printing keys and the actuator for the totalizers including the master wheel thereof as well as the relation between the operation of the vertical totalizers and the cross totalizers; and U. S. patent to Frederick A. Hart No. 2,063,737 issued December 8, 1936 and entitled "Combined Typewriting and Computing Machine" in which is clearly and in detail disclosed the relation between the totalizer entry mechanism, the printing mechanism and the power-operated drive therefor.

In the following description reference may be made to parts shown in these patents which are employed herein and in that case the numbers and figures referred to in said patents will be noted in parenthesis to enable the reader to readily refer to said parts in these patents.

In the electrified Remington bookkeeping typewriter generally disclosed in the above patents, when a numeral key 20 is depressed (see Fig. 4), a corresponding cam 21 on power shaft 22 becomes effective to permit movement of connected links 23 and 24 downward and operate fan cam 25 and thus, in the manner disclosed in the above Wahl patent, operate the master wheel 26 to set the engaged wheel 27 of the totalizer 28. There are a plurality of these vertical totalizers 28 mounted adjacent each other on a movable truck 29 slidable along the front of the frame 30 and connected, in the well known manner, at its ends to the movable carriage 31 which supports, among other elements, the platen 32. The master wheel 26 forms part of the well known actuator mechanism for the regular vertical totalizers 28 and as the numeral keys are successively operated the totalizers are stepped across to permit the entry of the successive values in its number wheels in the usual manner.

It is generally desired, when a value is entered into an order of a regular totalizer 28, to enter the same amount, additively or subtractively into a cross totalizer for the purpose of cross footing the entries of any given horizontal line on the entry sheet. Such a cross totalizer is shown in Fig. 1 and is numbered 33 (255, Fig. 1 of the Wahl patent). This cross totalizer is mounted in the usual manner on its own truck and is picked up in a well known manner by the successive vertical totalizers for the purpose of cross entry.

Figure 3:
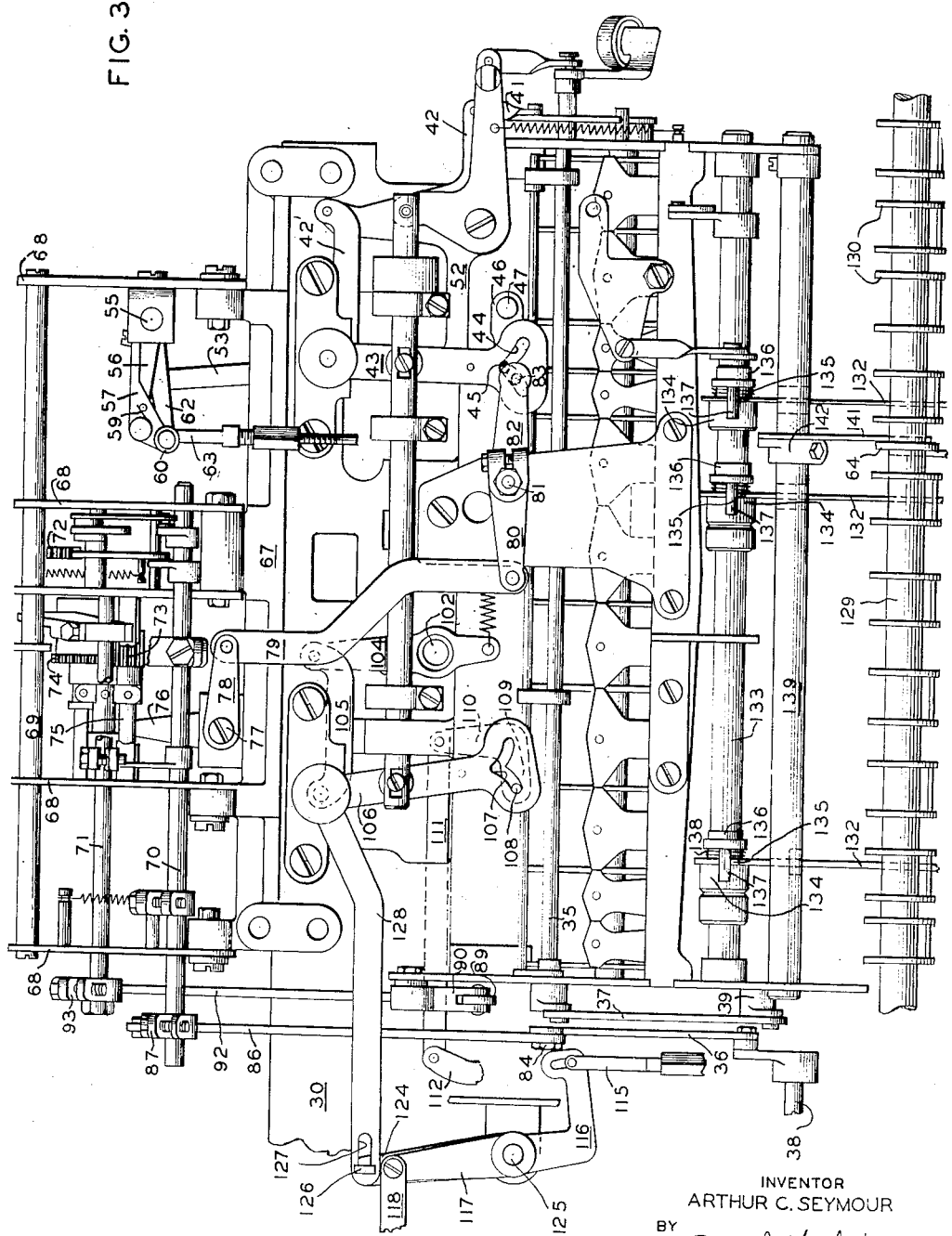
Fig. 3 is a similar view from the rear of the machine, with the casing removed.

In the operation of the actuator for the vertical totalizers 28 (Fig. 5) rock shaft 34 and sector shaft 35 are actuated (shafts 77 and 82 Fig. 3 of Wahl patent) and these in turn operate connecting links 36 and 37 (links 167 and 164 Fig. 3 of Wahl patent). These links in turn are connected to corresponding rock and sector shafts 38 and 39 (shafts 160 and 161 Fig. 3 of Wahl patent) which are disposed in the actuator mechanism for the cross totalizer 33 and are adapted in the well known manner to actuate the cross master wheel, not shown herein (master wheel 175 Fig. 9 of the Wahl patent).

In the operation of the vertical master wheel 26, in accordance with the general operation set forth in the Wahl patent supra, a shifting device was provided which permitted the master wheel to be conditioned for addition, subtraction, or to be disconnected, at will. This was accomplished by moving a lever corersponding to manual lever 40 (Fig. 7) to any one of three positions. In this machine this lever is connected by link 41, and a bell-crank lever 42 through the intermediary of connecting link 42' to a floating lever 43 having a slot 44 in which lies a pin 45 on an arm 46 on shaft 47 connected by arm 48 to a shift shaft 49. The movement of this shaft 47 interrelates gears such as 50 and 51 in the manner described in the Wahl patent to alter at will the nature of the operation of the master wheel 26 above mentioned. In accordance with the present invention, this lever arm 40 has however only two positions, an upper position in which the master wheel is connected for addition, and a lower position in which the master wheel is disconnected. The downward movement of the arm 40 beyond a certain point is limited by a stop pin 52' (Fig. 2) so that the arm 40 cannot be moved, as ordinarily, to its lowermost position.

In accordance with Fig. 7, when the arm 40 is depressed to disconnect the master wheel 26, the bell-crank lever 42 has an arm 52 connected to a link 53, pivoted to an arm 54 fastened to a shaft 55 carrying an arm 56. On the arm 56 is pivoted a lever 57 normally engaging a stop pin 58 and urged thereagainst by a spring 59. This lever 57 has a roller 60 which is adapted to be engaged by a cam 61 mounted on the carriage, which cam (see Fig. 1), when the carriage is being returned will engage the roller 60 and lift the roller and thus, as is evident, lift the arm 56 and rock the shaft 55 to restore the floating lever 43 and the arm 40 to normal position. The shaft 55 has also fixed thereon an arm 62 connected to a link 63 in turn connected to sub-lever 64 the action of which is to be described later. When this sub-lever 64 is actuated it pulls down on the link 63 and effects the disposition of the roller 60 in the path of the cam 61 the same as if the arm 40 had been moved downwardly. At the same time, the depression of link 63 also, through bell-crank 42 sets the floating lever 43 to set the master wheel 26 in the disconnected position. It is to be noted that when the roller is depressed and the cam engages it on the forward motion of the carriage, as distinguished from its return motion, the cam 61 will rotate the lever 57 around its pivot against the action of spring 59 but will not rotate the shaft 55. The sub-lever 64 is depressed by connection to a link 65 which in turn may be connected in any suitable manner to a gas shift key 66 (Fig. 1) and this key may be depressed whenever it is desired to enter and print items relating to the gas account instead of the electric account, rather than depressing the arm 40 by hand.

Figure 2:
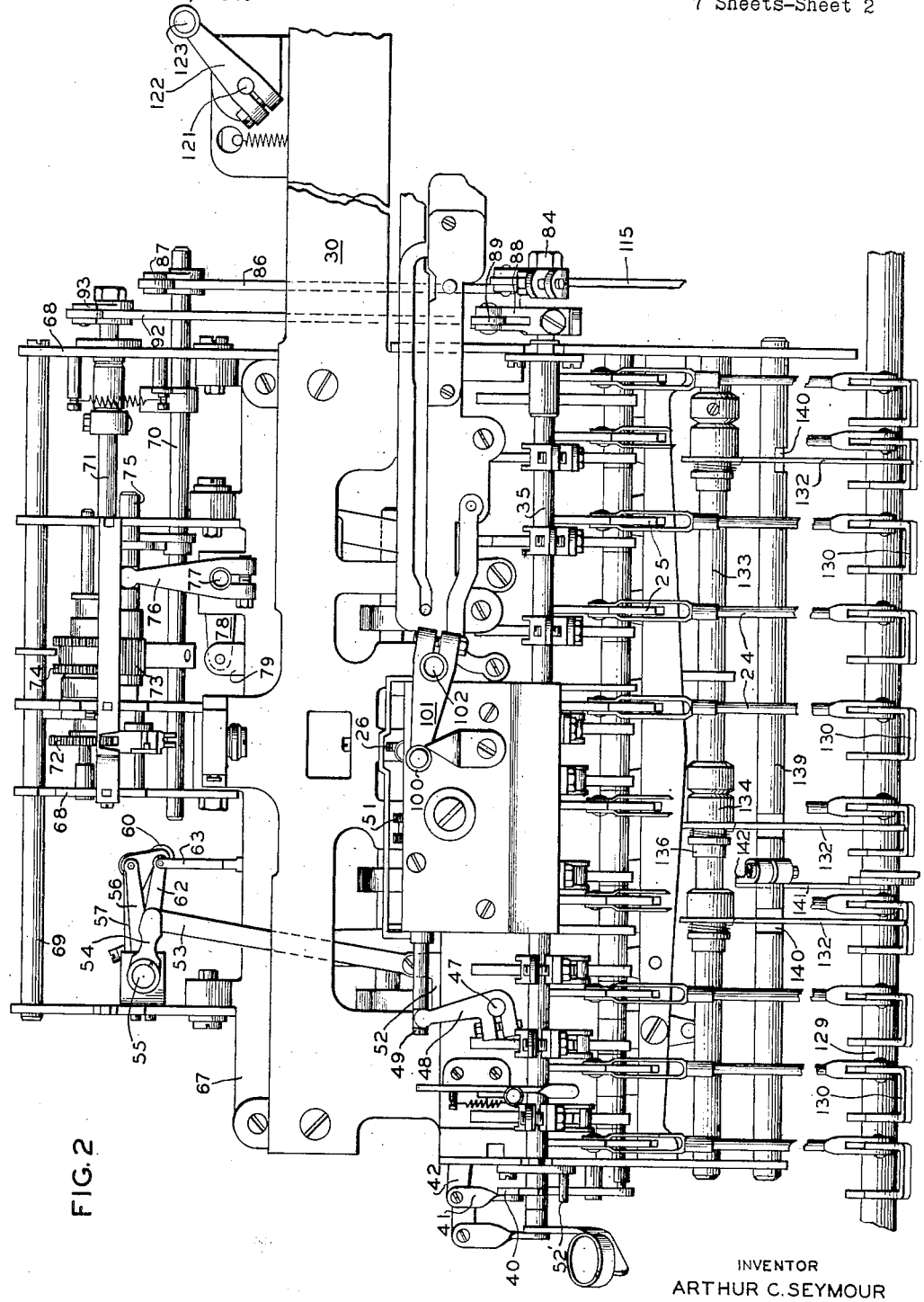
Fig. 2 is a fragmentary front elevation of the machine, with the casing removed, showing some of the mechanisms for shifting the connections to make one or the other set of totalizers operative.
Figure 5:
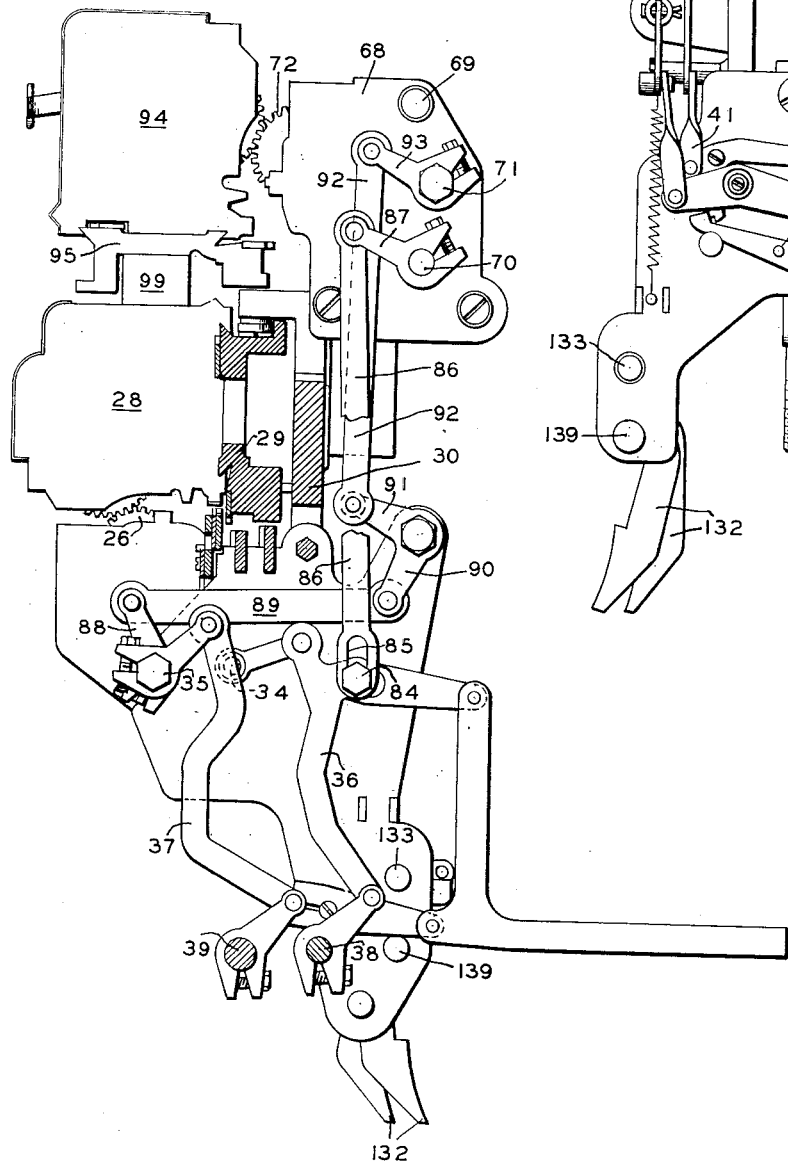
Fig. 5 is a vertical transverse section showing the manner in which the operation of the numeral key mechanism to print also operates both master wheel mechanisms.
Figure 6:
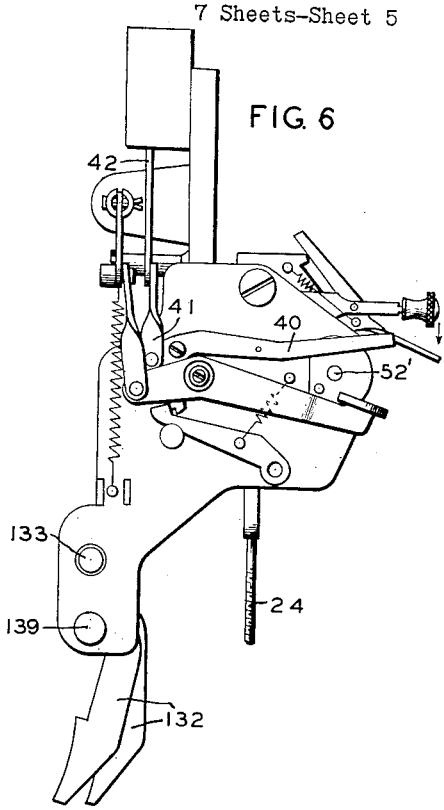
Fig. 6 is a partial vertical section showing particularly the lever for shifting the connections for operating one or the other master wheel.

A further feature of the invention, with especial reference to Figs. 2, 3, and 5, has to do with the provision of an extra auxiliary actuator adapted to be disposed to operate an extra set of vertical totalizers, later to be described, which extra set of superposed totalizers are adapted to receive, in the example herein set forth, numerical items relating to a "gas" account. This actuator comprises a frame plate 67 fastened to the back of the main frame plate 30, and provided with vertically disposed spaced partition plates such as 68 connected by horizontal cross spacing bars such as 69. Mounted on this frame plate assembly are the usual rock shaft 70 and the sector shaft 71 identical in function to the corresponding shafts 34 and 35 of the regular vertical actuator previously described. This auxiliary actuator also is provided with the master wheel 72 corresponding to the vertical master wheel 26 and with gears 73 and 74 corresponding to the previously mentioned gears 50 and 51. The gear 73 is mounted on shift shaft 75 which is operatively connected to an arm 76 on a shaft 77 to which is fixed an arm 78. To the arm 78 is connected a link 79 dependent to an arm 80 on a shaft 81 to which an arm 82 is fastened. This arm 82 has on its outer end a pin 83 projecting into the slot 44 of the floating lever 43 at a point closely adjacent the position of the pin 45 previously described. The various parts are so disposed that when the floating lever 43 is in its normal position i. e., with the lever 40 in the up position (see Figs. 3 and 6), the gears 50 and 51 are in the add position (not shown) wherein the sector gear is adapted to engage one of the gears 51. With the levers 40 and 43 in the same position, the gears 73 and 74 of the auxiliary actuator are in the disconnect position i. e., the gear 73 is in mesh with both gears 74 and all of the said gears are out of the path of operation of the auxiliary sector gear. When the lever 40 is in the down position as shown in Fig. 7, the floating lever 43 is in a position wherein the pins 45 and 83 have dropped in the slot 44. With the lever 43 in the above position, the gear 50 is in mesh with both gears 51, and all of the said gears 50 and 51 are out of the path of operation of the regular sector gear. The gears 73 and 74, however, have now shifted to the add position in which the gear 73 is in mesh with only one of the gears 74 while the other gear 74 is adapted to be engaged by the sector gear. Both sets of gears 50 and 73 are shifted simultaneously in the same direction either to the left or to the right according to the raising or lowering of the lever 40 respectively. When one of the gears 51 or 74 is moved into the path of operation of its respective sector gear, the other will move simultaneously out of the path of operation of its respective sector gear. It is, therefore, clear from the foregoing description that, when the arm 40 is in its upper position as shown in Fig. 6, the regular vertical actuator is in adding position and the auxiliary actuator is in disconnected position whereas when the arm 40 is moved down to its other and lower position (Fig. 7) the cooperative movement of the parts thus far described will cause the regular actuator to be moved to its disconnected position and the auxiliary actuator to be moved to its adding position.

It will therefore be clear that by moving the arm 40 to either position, items can be printed on the sheet along a line but can be selectively entered into one or the other of the sets of vertical totalizers. The practical application of this will be later explained in connection with a problem having to do with the entry of accounts having separate "electric" and "gas" items to be printed and entered.

Figure 4:
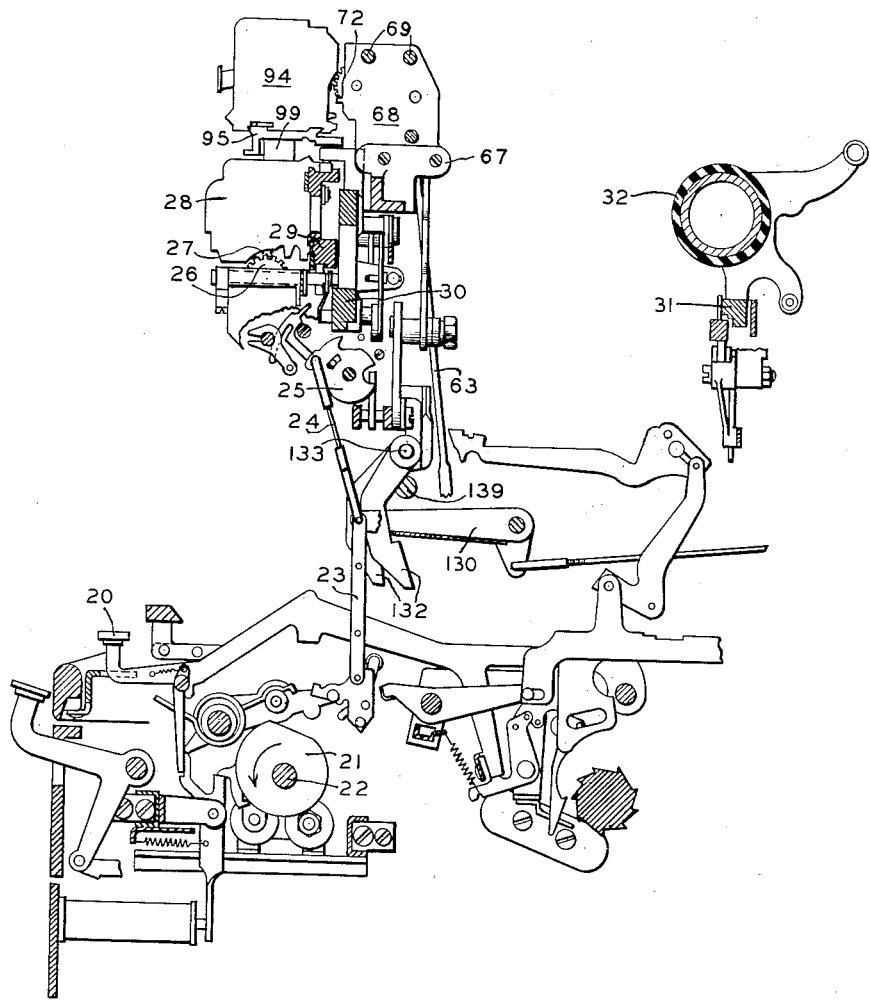
Fig. 4 is a general vertical transverse section through the machine showing the general relation between the sets of totalizers, their master wheels, and the power drive mechanism.

In order that the operation of the numeral keys 20 may be able also to cause the actuation of the master wheel 72 of the auxiliary actuator it will be evident, from a consideration of Fig. 4, that the operation of the keys will cause an actuation of the usual fan cam 25 and this in turn will cause (per Wahl patent) the actuation of the rock shaft 34 and the sector shaft 35. In Fig. 5 it is to be noted that shaft 34 is connected to link 36 having a pin 84 riding in a slot 85 in the lower end of a link 86 the upper end of which connects to arm 87 fixed to shaft 70 which is the rock shaft of the auxiliary actuator corresponding to the rock shaft 34 of the regular vertical actuator.

Similarly the sector shaft 35 has fixed thereto an arm 88 connected to a link 89 the other end of which is connected to an arm 90 of a bell crank lever the other arm 91 of which is connected to a link 92 which in turn is connected to an arm 93 fixed on shaft 71 which is the sector shaft of the auxiliary actuator corresponding to the sector shaft 35 of the regular actuator. It will be therefore clear that every time a numeral key is depressed both sets of rock and sector shafts are operated but which ones are effective to enter items depends upon which one of the actuators is operative or disconnected in accordance with the position of the arm 40 or the position of the "gas" shift key 66 previously described.

In the operation of the auxiliary master wheel 72, it is connected step by step in the manner set forth in the Wahl patent with the successive denominational wheels of a series of auxiliary totalizers 94. These totalizers are disposed in a row above the regular vertical totalizers 28 and may be mounted thereabove in several ways. One manner in which they may be mounted is shown in the drawings particularly in Figs. 1 and 5. A truck 95 with the usual teeth 96 at front and back is disposed horizontally above the lower set of totalizers 28. The extreme end totalizers 28 are dummies and, in any suitable manner, are provided with adjustable plates 97 at their top portions. On these plates are disposed blocks 99, one of which is clearly shown in Fig. 5. The ends of the auxiliary truck 95 are supported in any suitable manner on these blocks 99. The adjustability of the truck 95 on the plates 97 permits the upper set of totalizers to be aligned properly with respect to the respective lower ones when desired.

It will be noticed, that since the actuator for these upper totalizers is disposed in a horizontal plane back of them, they are therefore disposed with their ordinary tops and bottoms lying in a horizontal plane instead of in a vertical plane as are the lower regular totalizers 28. Consequently certain minor changes are necessary to allow for this new relative disposition such as the disposition of the number wheels and their openings in the totalizer casings etc.

In regard to the operation of the cross totalizers 33, they may be connected to receive entries no matter which one of the set of lower and upper totalizers are operatively in use for printing items on any given line and as well they may be disconnected at will. Generally these totalizers are adapted to be automatically disconnected or reversed in their action by the action of the vertical totalizers in a manner well known and clearly shown in the Wahl patent (especially with reference to parts 415, 416, 414 connected to the shift shaft 176 thereof). In the drawings herein similar parts comprise a roller 100 on the end of an arm 101 fixed to a shaft 102 (Figs. 1 and 2). On the other end of shaft 102 (Fig. 3) is fixed an arm 104, the upper end of which is connected to a link 105 connected to the upper end of a second floating lever 106 (similar to lever 405, Fig. 5 of the Wahl patent), the lower end of which lever 106 is provided with a slot 107, similar to the slot 44 in the previously mentioned floating lever 43. In the slot 107 rides a pin 108 on the end of one arm 109 of a bell crank lever the other arm 110 of which is connected to a link 111 which in turn is connected to a dependent arm 112 which is connected in a manner not shown to the shift shaft of the cross actuator in a similar manner to the connection between arm 401 and shift shaft 176 (shown in Fig. 17 of the Wahl patent). Therefore as the usual cams 113 on the vertical totalizers (see Fig. 1) are set to one of three positions in the customary manner so the cross actuator is set to add, to subtract, or to be disconnected as the successive vertical totalizers pass over the roller 100.

Under desired circumstances it is sometimes necessary to be able to disconnect the cross totalizers for more time than the passage of one vertical totalizer 28 over the roller 100 and to this end a device is provided whereby a manual key 114 (Fig. 1) may be depressed. This key is connected in any suitable manner to a dependent member 115 (Fig. 8) which has a slotted connection to one arm 116 of a bell crank lever the other arm 117 of which is connected to a link 118 connected to a pivoted arm 119 the upper end of which is adapted to be engaged by a pivoted latch element 120 fixed to a shaft 121, the other end of which carries an arm 122, the end of which bears a roller 123. It will be seen therefore that when the key 114 is depressed, the latch 120, urged down by spring 120' will hold the parts in their actuated position.

In connection with this latching operation just described, reference may be had to Fig. 8 to note an extra arm 124 mounted on a shaft 125 supporting the arms 116 and 117. The arm 124 has a pin 126 at its upper end projecting into a slot 127 in the left end of a link 128 which extends to the right (Fig. 3) and is connected to the upper end of the floating lever 106. It will be noted that the pin 126 normally, as shown in Fig. 3, lies in the left end of the slot 127 and therefore it is clear that the floating lever 106 can move counter-clockwise a certain distance without moving the pin 126. Conversely the pin 126 can be moved a bit to the right without affecting the link 128 but if it is moved its fullest possible distance to the right, by means of the key 114, then the link 128 is moved to the right and the floating lever is moved clockwise to effect the disconnection of the cross actuator in the manner above described.

When the cross actuator is disconnected and the parts are latched in the actuated condition as indicated in Fig. 9, it will be noted that the roller 123 is in an elevated position so that when the carriage is being returned this roller will be engaged and depressed by the underedge of the right end of the truck 95 for the upper series of totalizers 94 and will thus release the latch 120 and allow the parts to be restored to normal and the cross actuator to be placed in normal adding position.

It will, from the above description, be apparent that when the arm 40 (Fig. 7) is in its upper position, the actuator for the lower set of vertical totalizers is connected for association with them, and the actuator for the upper set of vertical totalizers is disconnected from them. In this position of the arm 40, the cross actuator may be connected or disconnected, depending upon whether or not the key 114 has been depressed. If it has been depressed, then the cross actuator is out and will remain out, since it is latched in its disconnected condition, until, on the return of the carriage, the roller 123 is depressed and the latch element 120 operated to release the cross actuator and allow it to return to normal condition.

It is also obvious that when the arm 40 is depressed and therefore moved to its lower position, either by manual movement of the arm 40 itself, or by the depression of the gas shift key 66, the actuator related to the lower set of vertical totalizers will be disconnected and the actuator related to the upper set of vertical totalizers will be in connected condition. In this position of the arm 40 also cross actuator may be in operative or inoperative condition depending upon whether, as before stated, the key 114 has been operated or not.

In the practical operation of this machine in making entries on successive lines on a sheet it is sometimes desirable to make entries of one character on one line and then make entries on the next line of a different character such as items relating to gas charges on one line and items relating to electric charges on an adjacent line. It is under such circumstances that preferably at the beginning of each line, a symbol is printed to indicate the class of items to be entered therein, such as "Gs" for gas and "El" for electric items, in order that the character of the items to be printed in a line may be indicated in connection with the line. For instance, if it is desired to print electric items on a given line, it will be assumed that it is also desired to enter these items in a set of the vertical totalizers, for example the lower set 28. In this case the arm 40 will be placed in its upper position, in which instance the "Gas" shift key 66 will not have been depressed.

It is therefore desired that when the parts are set to print and enter into the totalizers items of particular character such as electric items, the operator will not be able accidently to press down the printing key labelled "Gs" when she should press the key marked "El." Conversely, if the parts are set to print and enter into the totalizers items relating to gas charges, the operator will not be able accidently to press down the printing key labelled "El" when she should press the key marked "Gs."

Figure 10:
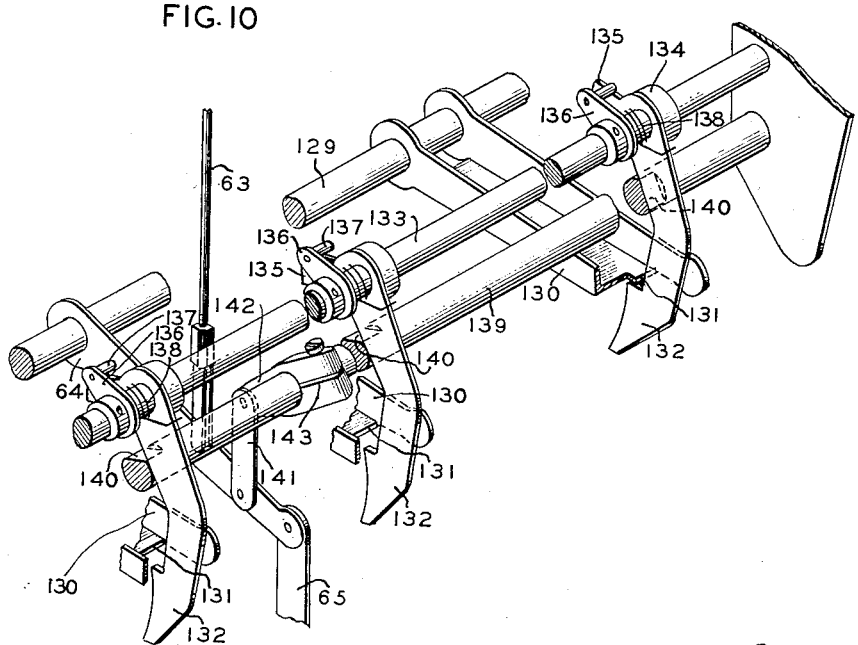
Fig. 10 is a similar view showing the same mechanism in another position latching down the "electric" key.
Figure 11:
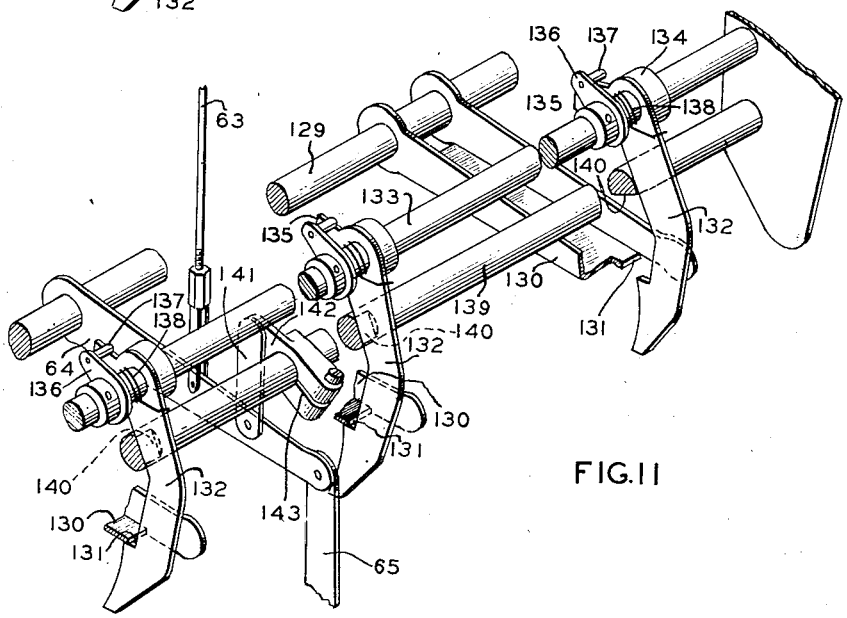
Fig. 11 is an isometric view of the mechanism for latching the "gas" and "electric" keys, the mechanism being shown in one position latching down the "gas" and "arrears" keys.

To this end means have been provided, shown generally in Figs. 10 and 11, in which Figure 10 shows the parts in position to block the printing of the symbol "El" and Figure 11 shows the parts in the position to block the printing of the symbol "Gs" and "Ar" which latter symbol would be printed on the same line with the gas items.

In these figures the shaft 129 acts as a pivot axis for a series of sub levers such as 130 which are generally channel shaped and have forward edges or lips 131. These levers are of the same type as those shown in Fig. 4 (and numbered 169 in the Hart patent supra). For each number key and certain symbol keys there will be one of these levers 130. Associated with those sub levers 130 related to the symbols "Gs," "El" and "Ar" are latch members in the form of hooked plates 132 dependent from a shaft 133. As shown more in detail in Figs. 3, 10 and 11, these plates 132 are mounted on sleeves 134 rotatable on the shaft 133 and each plate is provided with a finger 135 adapted to move therewith. Adjacent each sleeve 134 is an arm 136 fixed to the shaft 133 and having a laterally projecting pin 137 against which the finger 135 may abut when the plate 132 is moved in a rearward direction. A spring 138 is wrapped around the shaft 133 and its ends are respectively connected to the adjacent portions of the sleeve 134 and the arm 136 and tends to turn the plate 132 rearward around its pivot toward the related lip 131 of the adjacent sub lever 130 whereby it may hook under said lip and prevent downward movement of said lever. This rearward movement of the plate 132, however, is prevented, under certain conditions, by this movement being blocked by a shaft 139. This shaft 139 has cut-away portions or slots such as 140. These slots are disposed along shaft 139 at points corresponding to the positions of the dependent plates 132. However the two slots shown at the left in Fig. 11 are cut at the same angle on the shaft 139 whereas the slot at the right is cut at a different angle. Reading from left to right in Fig. 11 the dependent plates 132 are respectively concerned with the blocking or unblocking of the "gas" "arrears" and "electric" sub levers 130 and therefore of the corresponding keys on the keyboard.

By turning the shaft 139 through a predetermined angle the slots 140 can be presented alternately with respect to the adjacent plates 132 so as to permit the plates to move rearward far enough to engage the lips 131. As shown in Fig. 10 the right hand plate 132 has been permitted to move rearward and engage the lip of the sub lever 130 which is connected with the electric key so that that symbol cannot be printed. This is because the slot 140 associated with that plate has been turned to permit the plate to move into said slot and thus engage the lip. At the same time in the same Fig. 10 it is to be noted that the slots 140 associated with the plates 132 related to the gas and arrears keys are blocked from rearward movement because their respective slots have been turned away. In the other Fig. 11 the converse situation is shown in which the gas and arrears keys are blocked and the electric key is free to be operated.

The angular movement of this shaft 139 is achieved to produce this result as follows: Previously mentioned sub lever 64 which is depressed by the operation of the gas shift key 66 has connected thereto a link 141. The other end of the link 141 is connected to an arm 142 connected to a split collar 143 fastened to the shaft 139. The relation of the parts is so calculated that when the sub lever 64 is in the upper position the shaft 139, through these connections, will be positioned as shown in Fig. 11 whereas when the lever 64 is depressed, the parts will assume the positions shown in Fig. 10. It is therefore clear that when the gas shift key 66 is depressed an electric symbol cannot be printed and that when the gas shift key 66 is up, a gas or arrears symbol cannot be printed. Therefore if the mechanisms are set to enter and print electric items the operator cannot print a gas or arrears symbol on the line and vice versa. This will then automatically call to her attention either that she has tried to print the wrong symbol or that the mechanism is not set right for the character of the items she wishes to print and enter.

Having thus described the structure and operation of the various mechanisms of this machine which together constitute the new and useful improvement presented, it is desirable, briefly and generally, to describe the practical manipulation of the machine by an operator when she is printing a composite bill on a sheet, such as a combined bill for the consumption of electricity and gas.

Assuming that the items relating to the electric portion of the bill are to be printed on the first line, the carriage is moved to the right and the arm 40 is moved to the upper position, if it is not already there. In accordance with the described setup, this movement will make operative the actuator for the lower set of vertical totalizers which have been chosen to receive entries for the electric items on the bill whereas the upper set of vertical totalizers have been selected to receive entries of the gas items of the bill. It is of course understood that this arrangement can be reversed if desired and that the demonstration of the operation of the machine for a composite bill containing electric and gas items is only one of many forms of composite bills which can be printed and the items of which can be entered into the plurality of sets of vertical totalizers.

With the carriage in starting position and the parts set up for printing and entering electric items the operator then tabulates in the usual manner to a desired column where she presses the "El" symbol key to print this symbol thus indicating that the items and charges relate to the electric portion of the bill. Since the parts are properly set she can do this but if the arm 40 were down she could not print the "El" symbol for reasons previously explained. She then tabulates to another column where she types on to the bill sheet the present reading of the electric meter. In an adjacent column to which she has tabulated she then prints the previous reading of the electric meter. These items are not entered into the vertical totalizers 28 but they are entered into one of the cross totalizers 33 the first entry additively and the second subtractively thus resulting in the cross totalizer showing the net electric consumption. She then tabulates to another column where this net consumption in the cross totalizer can either be read by her and printed manually on the sheet and entered into one of the lower set of vertical totalizers or if desired this net consumption may be automatically printed and entered from the cross totalizer in a manner such as that disclosed in U. S. Patent 2,172,749, issued to G. G. Going.

The operator then examines her rate sheets to determine the gross cost of the amount consumed and types this on the machine after having tabulated the carriage to the desired column for such printing. This amount is also entered into the lower vertical totalizer 28 placed on the truck in line with this column. She then examines her sheets and determines the net cost of the electric items after deducting a suitable percentage from the gross cost just entered. This amount is then printed in the proper column to which the carriage has been tabulated. These constitute the ordinary items entered in the line although it must be understood that other items may be entered and printed.

After the operator has finished with the electric item line, assume that on the next line it is desired to print corresponding items in terms of the gas consumption and the respective charges therefor. It is therefore necessary for the carriage to be returned in any suitable manner and spaced to the proper line. Then the arm 40 is moved down or the Gas shift key 66 is depressed which in either case will transfer the operative connections as previously described so that the actuator related to the upper set of vertical totalizers 94 will be made operative and the actuator related to the lower set of vertical totalizers 28 will be rendered inoperative.

The operator then proceeds to print and enter the "gas" items in the new line, first printing the symbol "Gs" at the beginning thereof. It must be now clear that if she accidentally tried to actuate the "El" key, she would be unable to depress it because it would be locked against actuation in the manner already described. After printing the symbol "Gs," the operator then proceeds, in a manner similar to the entry of electric items, to print and enter the various gas items in the vertical columns of the sheet directly under the corresponding columns for the electric items. At the right of the entries in the gas line there will be a tabulation to an added column which is not in the electric line, namely the column for the printing and entry of arrears, which the operator gets from her records and prints and enters accordingly.

At the end of the gas line of entries, the operator returns the carriage and on this return the carriage through the cam 61 will automatically return the parts to the condition in which the actuators and the totalizers are potentially related for the entry of electric items on the next line.

At any time during the operation, if the character of the entries to be made does not require that the cross actuator be in operation, it is merely necessary for the operator to depress the key labelled "Act. Dis" numbered 114 and this actuator is made instantly ineffective to receive entries. However, as has been explained, as soon as the carriage is returned, this actuator is put back into effective operation by the engagement of the truck 95 with the roller 123.

In view of the foregoing detailed description of the construction and operation of my improved machine, it will be apparent that it provides simple and efficient means whereby an operator may enter on a line items relating to a given character of information and is able to enter numerical values of said items in one or the other of two sets of superposed vertical totalizers. It is possible therefore to selectively enter the items numerically into different totalizers while printing them and keeping correspondingly similar items of the separate lines of entries in the same vertical columns.

It is further apparent that the relation of the parts can be readily shifted to transfer entry from one set of totalizers to another and that their relation is restored to normal automatically when the carriage is returned to starting position. It is also impossible for an operator to print a given symbol at the beginning of a line when the parts are set to print and enter items requiring or related to a different kind of symbol. At any time the cross totalizer can be disconnected at will and then automatically restored when the carriage is returned to starting position.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a computing and recording machine, a frame, a movable carriage supported on said frame, a totalizer truck mounted on said carriage, a set of vertical totalizers disposed on said truck, a second set of vertical totalizers mounted on said truck in position superposed with respect to the first set of totalizers, and a lever for simultaneously rendering one of said sets operative and the other set inoperative.

2. In a computing and recording machine, a frame, a movable carriage supported on said frame, a totalizer truck mounted on said carriage, a vertical totalizer disposed on said truck, a second vertical totalizer mounted on said truck in a position superposed with respect to the first totalizer, a separate master wheel for each totalizer, a lever movable to two positions and adapted in one position to connect one totalizer to its master wheel and disconnect the other master wheel from its totalizer, and in the other position to reverse said connections.

3. In a computing and recording machine, a frame, a movable carriage supported on said frame, a totalizer truck mounted on said carriage, a vertical totalizer disposed on said truck, a second vertical totalizer mounted on said truck in a position superposed with respect to the first totalizer, a separate master wheel for each totalizer, means operable at will to render operative one master wheel while the other master wheel is rendered inoperative and vice versa, and means on the carriage and adapted, when the carriage is returning to normal starting position, to be associated with the means operable at will to make operative one master wheel and to make inoperative the other master wheel.

4. In a computing and recording machine, a floating lever, a pair of actuators, operative connections from the lever to the actuators, and means for moving said lever to change the relative positions of said connections thereby simultaneously setting one actuator in its operative condition, the other in its inoperative condition and vice versa.

5. In a computing and recording machine, a floating lever, a pair of actuators having master wheels disposed in the same vertical plane, operative connections from the floating lever to said actuators, and means for moving said floating lever to change the relative positions of said connections, thereby rendering the master wheels alternately ineffective and vice versa.

6. In a computing and recording machine, a floating lever, a pair of actuators, operative connections from the floating lever to said actuators, means for moving said lever to change the relative positions of said connections, thereby rendering the actuators alternately effective and ineffective and vice versa, a carriage, a cam on said carriage, a control element associated with said connections and movable to a position in the path of said cam when the parts are in a predetermined relative position, said element adapted to be engaged by the cam on the return of the carriage to restore the parts to another relative position.

7. In a computing and recording machine, a floating lever, a pair of actuators having master wheels disposed in the same vertical plane, operative connections from the floating lever to said actuators, means for moving said lever to change the relative positions of said connections, thereby rendering the master wheels of said actuators alternately ineffective and vice versa, a carriage, a cam on said carriage, a control element associated with said connections and movable to a position in the path of said cam when the parts are in a predetermined relative position, said element adapted to be engaged by the cam on the return of the carriage to restore the parts to another relative position.

8. In a computing and recording machine, a slotted floating lever, a pair of actuators, pins disposed in the slot of the lever, operative connections from the pins to the actuators, and means for moving said lever to change the positions of said pins, thereby simultaneously setting one actuator in its operative condition, the other in its inoperative condition and vice versa.

9. In a computing and recording machine, a slotted floating lever, a pair of actuators having master wheels disposed in the same vertical plane, pins disposed in the slot of the lever, operative connections from the pins to the actuators, and means for moving said lever to change the positions of said pins, thereby simultaneously setting one actuator in its operative condition, the other in its inoperative condition and vice versa.

10. In a computing and recording machine, a slotted floating lever, a pair of actuators, pins disposed in the slot of the lever, operative connections from the pins to the actuators, means for moving said lever to change the positions of said pins, thereby simultaneously setting one actuator in its operative condition, the other actuator in its inoperative condition and vice versa, a carriage, a cam on said carriage, a control element associated with said connections and movable to a position in the path of said cam when the parts are in a predetermined relative position, said element adapted to be engaged by the cam on the return of the carriage to restore the parts to another relative position.

11. In a computing and recording machine, a slotted floating lever, a pair of actuators having vertically superposed master wheels, pins disposed in the slot of the lever, operative connections from the pins to the actuators, means for moving said lever to change the positions of said pins, thereby rendering the master wheels of the actuators alternately ineffective and vice versa, a carriage, a cam on said carriage, a control element associated with said connections and movable to a position in the path of said cam when the parts are in a predetermined relative position, said element adapted to be engaged by the cam on the return of the carriage to restore the parts to another relative position.

12. In a computing and recording machine, a cross actuator, a carriage, a floating lever, mechanism connecting the cross actuator with the floating lever, key-operated mechanism associated with said floating lever and adapted to move it to a predetermined position to disconnect the cross actuator, a spring urged latch finger adapted automatically to engage a portion of the key-operated mechanism to hold it in operated position when so moved, a control roller associated with the latch finger and moved to a predetermined position when the finger is in its latching position, said roller adapted, when so moved, to be in the path of a portion of the carriage to be depressed when the carriage is returned thereby to release the latch finger and allow the key-operated mechanism to return to normal condition whereby the floating lever is returned to normal position and the cross actuator is moved to connected condition.

13. In a computing and recording machine, a frame, a carriage movable on said frame, a totalizer truck movable with the carriage, superposed vertical totalizers on said truck, actuators on the frame having master wheels disposed in the same vertical plane and adapted to be respectively connected with said totalizers, said actuators having corresponding sector, rock, and shift shafts, and a lever for simultaneously and similarly actuating the sector and rock shafts, the said lever simultaneously but in opposite manner operating the shift shafts whereby the actuators are alternately placed in connected and disconnected condition.

14. In a computing and recording machine, a frame, a carriage movable on said frame, a totalizer truck movable with the carriage, superposed vertical totalizers on said truck, actuators on the frame having master wheels disposed in the same vertical plane and adapted to be respectively connected with said totalizers, said actuators having corresponding sector, rock, and shift shafts, linkages connecting the rock and sector shafts of one actuator with those of the other, key-operated means for actuating said rock and sector shafts simultaneously and in a similar manner, a floating lever, linkages connecting the floating lever wth the shift shafts, means for moving the floating lever in one direction or another, said latter linkages so related that the movement of the floating lever will move the shift shafts simultaneously but in opposite manner whereby the shift shafts alternately place the actuators in connected and disconnected condition.

15. In a computing and recording machine, a frame, a carriage movable on said frame, a totalizer truck movable with the carriage, superposed vertical totalizers on said truck, actuators on the frame having master wheels disposed in the same vertical plane and adapted to be respectively connected with said totalizers, said actuators having corresponding sector, rock, and shift shafts, means for simultaneously and similarly actuating the sector and rock shafts of both actuators, means for simultaneously but in opposite manner operating the shift shafts whereby the actuators are alternately placed in connected and disconnected condition, a cam on said carriage, a control element associated with the means for operating the shift shafts and movable to a position in the path of said cam when the shift shafts are placed in a given condition, said control element adapted to be engaged by the cam on the carriage on return of said carriage to restore the parts to another relative condition.

16. In a computing and recording machine, a frame, a carriage movable on said frame, a totalizer truck movable with said carriage, superposed vertical totalizers on said truck, actuators on the frame having master wheels disposed in the same vertical plane and adapted to be respectively connected with said totalizers, said actuators having corresponding sector, rock, and shift shafts, linkages connecting the rock and sector shafts of one actuator with those of the other, key-operated means for actuating said rock and sector shafts simultaneously and in a similar manner, a floating lever, linkages connecting the floating lever with the shift shafts, means for moving the floating lever in one direction or another, said latter linkages so related that the movement of the floating lever will move the shift shafts simultaneously but in opposite manner whereby the shift shafts alternately place the actuators in connected and disconnected condition, a cam on said carriage, a control element associated with the means for moving the floating lever and movable to a position in the path of said cam when the shift shafts are placed in a given condition, said control element adapted to be engaged by the cam on the carriage on the return of the carriage to return the parts to another relative condition.

17. In a computing and recording machine, a frame, a carriage movable on said frame, a totalizer truck movable with the carriage, superposed vertical totalizers on said truck a plurality of key-operated sub-levers, a plurality of actuators, movable means for alternately making said actuators effective and ineffective to operate said totalizers, latch members engageable with certain of said sub-levers to block operation of keys correspondingthereto, means operable by said movable means to cause one of said latches to be effective to latch one of said sub-levers from movement in one position of said movable means, and to cause another of said latches to be effective to latch another of said sub-levers from movement in another position of said movable means whereby certain keys can not be operated in each position of the movable means.

18. In a computing and recording machine, a frame, a carriage movable on said frame, a totalizer truck movable with the carriage, superposed vertical totalizers on said truck a plurality of key-operated sub-levers, a plurality of actuators, movable means for alternately making said actuators effective and ineffective to operate said totalizers, pivoted latch plates engageable with said sub-levers and adapted to latch them to block operation of keys corresponding thereto when the plates move to a predetermined position with respect to the sub-levers, a blocking element associated with the moving means and movable to a plurality of positions as said moving means is moved, means on said blocking element to block one latch plate from moving to its effective latching position when the moving means is in one position and to block another latch plate from moving to its effective latching position when the moving means is in another position.

19. In a computing and recording machine, a frame, a carriage movable on said frame, a totalizer truck movable with the carriage, superposed vertical totalizers on said truck a plurality of key-operated sub-levers, a plurality of actuators, movable means for alternately making said actuators effective and ineffective to operate said totalizers, pivoted latch plates engageable with said sub-levers and adapted to latch them to block operation of keys corresponding thereto when the plates move to a predetermined position with respect to the sub-levers, a rotatable blocking shaft connected to the movable means and movable thereby to a plurality of angular positions, said blocking shaft lying in the path of movement of the latch plates when they move in a given direction, said blocking shaft being provided with a plurality of slots disposed therealong in line with the path of movement of said plates, one of said slots, in one angular position of the blocking shaft positioned to permit further movement of one of said plates whereby it can move to latching position with respect to one of said sub-levers, another of said slots, in another angular position of the blocking shaft positioned to permit further movement of another of said plates whereby it can move to latching position with respect to another of said sub-levers, whereby the operation of certain key-operated sub-levers will depend upon which actuator is in connected or disconnected condition.

20. In a computing and recording machine, a pair of totalizer actuators having master wheels disposed in the same vertical plane, a plurality of key operated sub-levers, latch members engageable with certain of said sub-levers for blocking operation of keys corresponding thereto, a floating lever for making said actuators effective and ineffective, movable means associated with said floating lever and said latch members to cause one of said latches to be effective to latch one of said sub-levers from movement in one position of said floating lever and to cause another of said latches to be effective to latch another of said sub-levers from movement in another position of said floating lever whereby certain keys cannot be operated in each position of the movable means.

21. In a computing and recording machine, a pair of totalizer actuators having master wheels disposed in the same vertical plane, a plurality of key operated sub-levers, a floating lever for making said actuators effective and ineffective, pivoted latch plates engageable with said sub-levers and adapted to latch them to block operation of keys corresponding thereto when the plates move to a predetermined position with respect to the sub-levers, a blocking element associated with the floating lever and movable to a plurality of positions as said floating lever is moved, means on said blocking element to block one latch plate from moving to its effective latching position when the floating lever is in one position and to block another latch plate from moving to its effective latching position when the floating lever is in another position.

22. In a computing and recording machine, a pair of totalizer actuators having master wheels disposed in the same vertical plane, a plurality of key operated sub-levers, movable means including a floating lever for making said actuators effective and ineffective, pivoted latch plates engageable with said sub-levers and adapted to latch them to block operation of keys corresponding thereto when the plates move to a predetermined position with respect to the sub-levers, a rotatable blocking shaft connected to the floating lever and movable thereby to a plurality of angular positions, said blocking shaft lying in the path of movement of the latch plates when they move in a given direction, said blocking shaft being provided with a plurality of slots disposed therealong in line with the path of movement of said plates, one of said slots, in one angular position of the blocking shaft positioned to permit further movement of one of said plates whereby it can move to latching position with respect on one of said sub-levers, another of said slots in another angular position of the blocking shaft positioned to permit further movement of another of said plates whereby it can move to latching position with respect to another of said sub-levers, whereby the operation of certain key operated sub-levers will depend upon which actuator is in effective or ineffective condition.

23. In a computing and recording machine, a frame, a carriage movable on said frame, a totalizer truck movable with the carriage, superposed vertical totalizers on said truck, a pair of actuators having master wheels disposed in the same vertical plane to operate said totalizers, a plurality of key operated sub-levers, latch members engageable with certain of said sub-levers for blocking operation of keys corresponding thereto, a floating lever, movable means including said floating lever for making the actuators effective and ineffective, means operable with said floating lever and said latch members to cause one of said latches to be effective to latch one of said sub-levers from movement in one position of said floating lever and to cause another of said latches to be effective to latch another of said sub-levers from movement in another position of said floating lever whereby certain keys cannot be operated in each position of the movable means.

24. In a computing and recording machine, a frame, a carriage movable on said frame, a totalizer truck movable with the carriage, superposed vertical totalizers on said truck, a pair of actuators having master wheels disposed in the same vertical plane to operate said totalizers, a plurality of key operated sub-levers, latch members engageable with certain of said sub-levers for blocking operation of keys corresponding thereto, a floating lever, movable means including the floating lever for making said actuators effective and ineffective to operate said totalizers, pivoted latch plates associated with said sub-levers and adapted to latch them when the plates move to a predetermined position with respect to the sub-levers, a blocking element associated with the floating lever and movable to a plurality of positions as said floating lever is moved, means on said blocking element to block one latch plate from moving to its effective latching position when the floating lever is in one position and to block another latch plate from moving to its effective latching position when the floating lever is in another position.

25. In a computing and recording machine, a frame, a carriage movable on said frame, a totalizer truck movable with the carriage, superposed vertical totalizers on said truck, a pair of actuators having master wheels disposed in the same vertical plane to operate the totalizers, a plurality of key operated sub-levers, movable means including a floating lever for making said actuators effective and ineffective to operate said totalizers, pivoted latch plates engaging with said sub-levers and adapted to latch them when the plates move to a predetermined position with respect to the sub-levers to block operation of keys corresponding thereto, a rotatable blocking shaft connected to the floating lever and movable thereby to a plurality of angular positions, said blocking shaft lying in the path of movement of the latch plates when they move in a given direction, said blocking shaft being provided with a plurality of slots disposed therealong in line with the path of movement of said plates, one of said slots, in one angular position of the blocking shaft positioned to permit further movement of one of said plates whereby it can move to latching position with respect to one of said sub-levers, another of said slots, in another angular position of the blocking shaft positioned to permit further movement of another of said plates whereby it can move to latching position with respect to another of said sub-levers, whereby the operation of certain key operated sub-levers will depend upon which actuator is in effective or ineffective condition.

ARTHUR C. SEYMOUR.

REFERENCES CITED

The following references are of record in the file of this patent:

UNITED STATES PATENTS

| Number | Name | Date |
| --- | --- | --- |
| 893,717 | Wahl | July 21, 1908 |
| 893,723 | Goldberg | July 21, 1908 |
| 1,270,471 | Wahl | June 25, 1918 |
| 1,293,219 | Sheldon | Feb. 4, 1919 |
| 1,320,018 | McKay | Oct. 28, 1919 |
| 1,404,954 | Goldberg | Jan. 31, 1922 |
| 1,433,737 | Morgan | Oct. 31, 1922 |
| 1,555,155 | Poole | Sept. 29, 1925 |
| 1,693,753 | Hart | Dec. 4, 1928 |
| 1,767,792 | Hart | June 24, 1930 |
| 1,811,227 | Foothorap | June 23, 1931 |
| 1,968,894 | Kurowski | Aug. 7, 1934 |